(12) United States Patent
Carney et al.

(10) Patent No.: US 9,197,666 B2
(45) Date of Patent: Nov. 24, 2015

(54) METHOD AND APPARATUS FOR MITIGATING DISTRIBUTED DENIAL OF SERVICE ATTACKS

(71) Applicant: Verizon Patent and Licensing Inc., Basking Ridge, NJ (US)

(72) Inventors: Mark D Carney, Sterling, VA (US); Jeffrey A Jackson, Coppell, TX (US); Andrew L Bates, Peyton, CO (US); Dante J Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 14/010,110

(22) Filed: Aug. 26, 2013

(65) Prior Publication Data

US 2015/0058976 A1    Feb. 26, 2015

(51) Int. Cl.
*G06F 11/00* (2006.01)
*H04L 29/06* (2006.01)

(52) U.S. Cl.
CPC ........ *H04L 63/1458* (2013.01); *H04L 63/1408* (2013.01)

(58) Field of Classification Search
CPC ............ H04L 63/1458; H04L 63/1416; H04L 63/1425; H04L 2463/141; H04L 63/0421; H04L 63/1408
USPC ............................................... 726/22, 23, 25
See application file for complete search history.

(56) References Cited

U.S. PATENT DOCUMENTS

| | | | | |
|---|---|---|---|---|
| 5,708,655 A * | 1/1998 | Toth et al. | ...................... | 370/313 |
| 6,012,088 A * | 1/2000 | Li et al. | ......................... | 709/219 |
| 7,139,833 B2 * | 11/2006 | Heller | ........................... | 709/238 |
| 7,853,680 B2 * | 12/2010 | Phatak | ........................... | 709/223 |
| 8,627,477 B2 * | 1/2014 | Chen et al. | ...................... | 726/24 |
| 8,949,459 B1 * | 2/2015 | Scholl | ........................... | 709/239 |

OTHER PUBLICATIONS

Cisco, "DHCP Overview" Updated: Apr. 30, 2012.*
Dhananjay Phatak "spread identity a new dynamic address remapping mechanism for anonymity and ddos defense" Jan. 20, 2011.*

* cited by examiner

*Primary Examiner* — Samson Lemma

(57) ABSTRACT

An approach for mitigating distributed denial of service (DDoS) attacks includes assigning a set of temporary network addresses to a hostname for a finite period and assigning one or more other sets of temporary network addresses to the hostname in one or more following finite periods, responding to a hostname lookup request based on the set of temporary network addresses, the one or more other sets of temporary network addresses, or a combination thereof that are active, responding to a network address lookup request based on at least one of the set of temporary network addresses and the one or more other sets of temporary network addresses that is associated with a current one of the finite period or the one or more following finite periods, and retiring the set of temporary network addresses, the one or more sets of temporary network addresses, or a combination thereof after a configurable number of finite periods, wherein no further network address or hostname lookup request is served based on the retired set of temporary network addresses, the retired one or more sets of temporary network addresses, or a combination thereof.

20 Claims, 12 Drawing Sheets

FIG. 1B

REPUTATION DATABASE 117

| External Network Device Address | External Network Device Name | Customer Network Device Address | Reputation Score |
|---|---|---|---|
| 1.1.1.1 | host1.domain1.com | 11.11.11.11 | 10 |
| 1.1.1.2 | - | - | - |
| 1.1.1.3 | host2.domain2.org | 22.22.22.22 | 0 |
| 1.1.1.4 | host3.domain3.net | 33.33.33.33 | 100 |
| 1.1.1.5 | - | - | - |
| 1.1.1.6 | - | - | - |
| ... | | | |

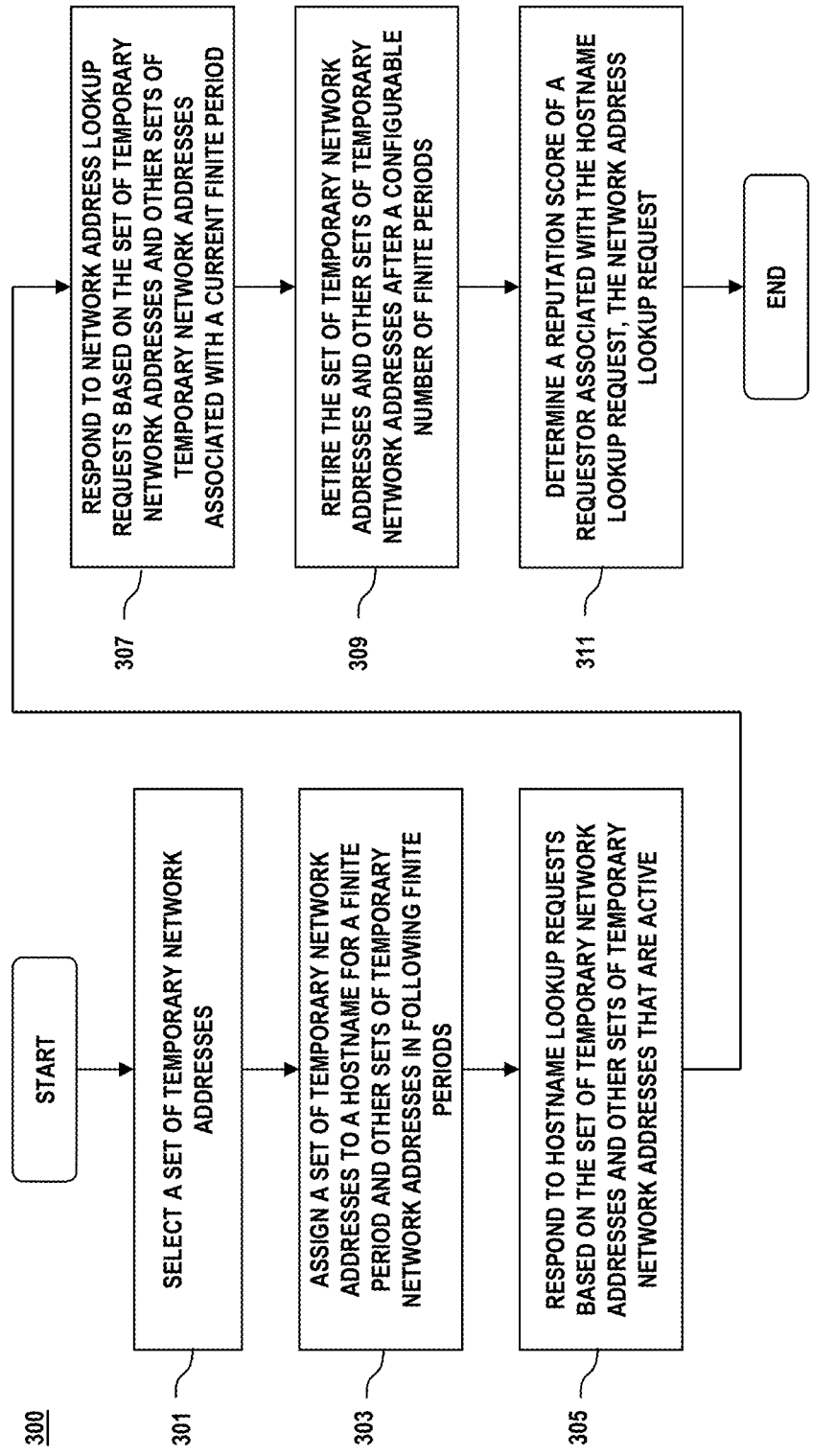

METHOD AND APPARATUS FOR MITIGATING DISTRIBUTED DENIAL OF SERVICE ATTACKS

FIELD OF THE INVENTION

The present invention relates to data communications, and more particularly, to network security.

BACKGROUND OF THE INVENTION

The phenomenal growth of the Internet has presented network service providers (e.g., Internet Service Providers (ISPs)) with the continual challenge of responding to users' demands for reliable, secure, fast and dependable access to this global resource. Satisfying these demands is imperative to maintaining a competitive edge in an intensely competitive market. The vast user base has heightened service providers as well as their customers' susceptibility to security threats. In the past, network security responsibilities have largely been the charge of the end users. However, service providers have come to recognize the commercial viability of offering security services. Undoubtedly, security attacks and breaches impose a heavy cost to both the service providers and their customers.

A particularly troubling type of security concern is the various types of packet flood attacks that negatively impact service availability. Packet flood attacks are a type of denial of service (DoS) attack. A DoS attack is initiated by an attacker to deliberately interfere or disrupt a subscriber's datagram delivery service. A packet flood attack differs from other types of denial of service attacks in that a flood attack requires constant and rapid transmission of packets to the victim in order to be effective. The flood attack overwhelms the victim's connection and consumes precious bandwidth on the service provider's core or backbone networks. Examples of packet flood attacks specific to Unreliable Datagram Delivery Service Networks utilizing IP (Internet Protocol) include ICMP (Internet Control Message Protocol) flood, "SMURF" (or Directed Broadcast Amplified ICMP Flood), "Fraggle" (or Directed Broadcast UDP (User Datagram Protocol) Echo Flood), and TCP (Transmission Control Protocol) SYN flood. These attacks effectively prevent the subscribers from accessing the Internet; in some circumstances, the effects of these attacks may cause a victim host to freeze, thereby requiring a system reboot. In addition to being a nuisance, a system freeze can result in loss of data if precautions were not taken in advance. Because of the severe and direct impact these attacks have on subscribers, a service provider needs an effective mechanism to detect and prevent or minimize these DoS attacks.

Distributed Denial of Service (DDoS) attacks are notoriously difficult to defend against because a multitude of compromised systems are used to implement the attack. Typically, an attacker causes one compromised system (the DDoS "master") to identify and infect numerous other systems (DDoS "bots" or "botnets") to launch an attack against a single target. Like many other types of DoS attacks, the attacker can forge the source address of the flood packets originating from the bots without reducing the effectiveness of the attack. Determining and tracking the source of forged datagrams in destination-based routing systems is difficult given the premium on processing capacity to perform the packet diagnostics that are required to determine the source. In addition, investment in anti-DDoS technology leads to service providers becoming locked in to costly, proprietary solutions. As a result, service providers are unable to reliably and cost-effectively mitigate DDoS attacks.

Based on the foregoing, there is a clear need for improved approaches for mitigating DDoS attacks.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a diagram of entries in a reputation database, according to one embodiment;

FIG. 3A-3C are flowcharts of processes for mitigating DDoS attacks, according to one embodiment;

DESCRIPTION OF THE PREFERRED EMBODIMENT

An apparatus, method, and software for mitigating Distributed Denial of Service (DDoS) attacks are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to DDoS attacks and the global Internet, it is contemplated that these embodiments have applicability to other security threats and data networks.

Figure 1A:
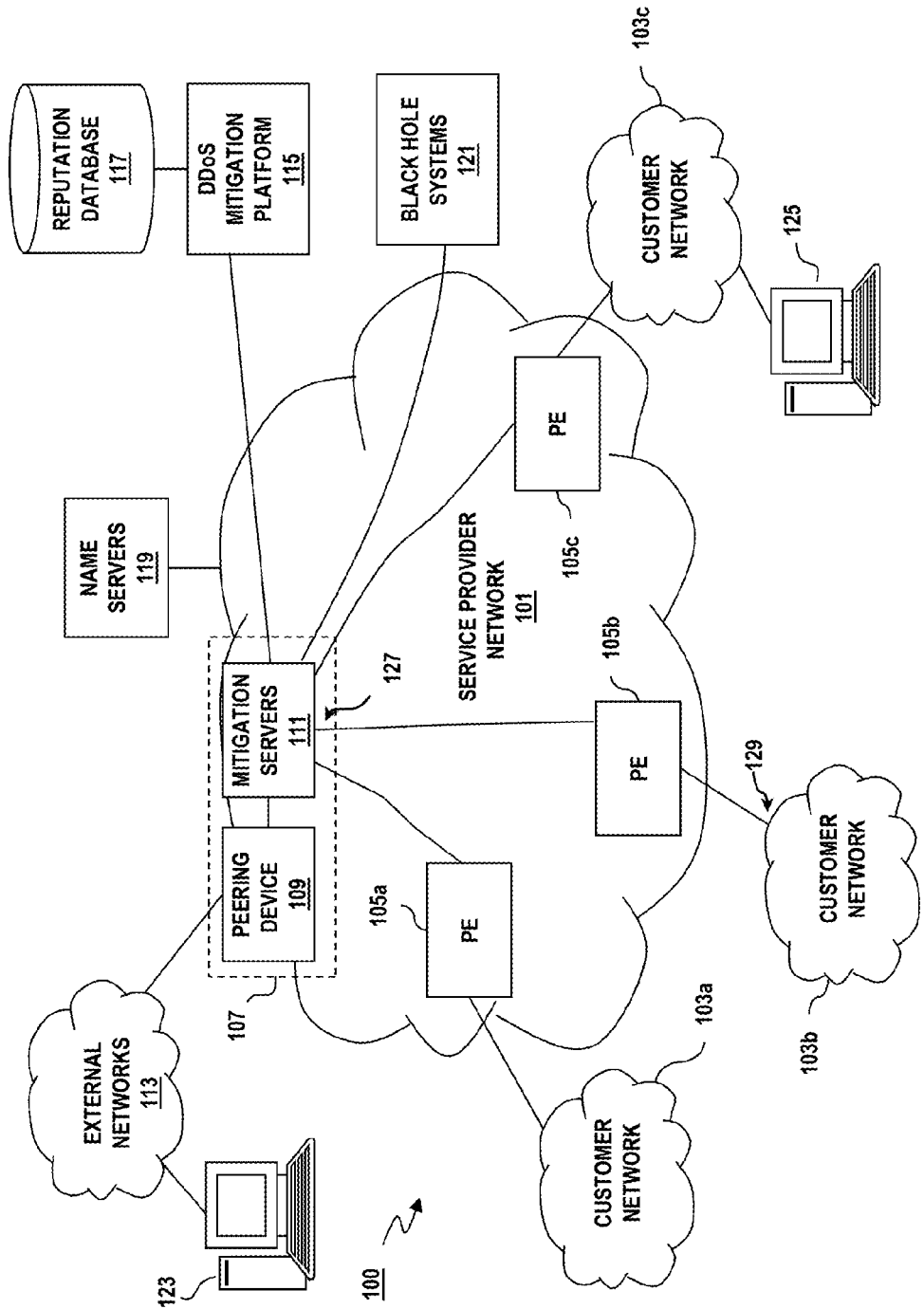
FIG. 1A is a diagram of a system capable of mitigating Distributed Denial of Service (DDoS) attacks, according to one embodiment.

FIG. 1A is a diagram of a communication system 100 capable of mitigating DDoS attacks, according to one embodiment. The communication system 100 includes a service provider network 101. The service provider network 101 serves customer networks 103a-103c (collectively referred to as customer networks 103) via Provider Edge (PE) devices 105a-105c (collectively referred to as PE devices 105), respectively. By way of example, the PE devices 105 are edge routers in communication with a peering point 107. In one embodiment, the peering point 107 may include a peering device 109 (e.g., router) and the mitigation servers 111. The service provider network 101 transports traffic between the customer networks 103 and external networks 113 via the peering point 107. The service provider network 101, among other telecommunication services, can support a data transport service utilizing, for example, multilayer switching to integrate Layer 2 switching and Layer 3 routing. As used herein, Layer 2 and Layer 3 refer to the Open System Interconnection (OSI) model or other equivalent models. Multilayer switching, in an exemplary embodiment, can be employed according to the Multiprotocol Label Switching (MPLS) protocol as specified by the Internet Engineering Task Force (IETF).

The peering point 107 may refer to an administrative demarcation point between the service provider network 101 and the external networks 113. The peering device 109 may provide connectivity to the external networks 113 via the communication link connecting the two networks. In one embodiment, the peering device 109 provides connectivity to the external networks 113 via an external gateway protocol (e.g., Border Gateway Protocol (BGP)). As shown, the mitigation servers 111 receive all traffic entering the service provider network 101 via the peering device 109. Similarly, all traffic leaving the service provider network 101 exits via the connection between the mitigation servers 111 and the peering device 109. Although only one such peering point 107 is shown in FIG. 1A, it is contemplated that the service provider network 101 may have multiple peering points with each peering point including its own set of mitigation servers 111. The location of these peering points may be selected to facilitate load distribution and sharing across the network infrastructure.

According to one embodiment, the mitigation servers 111 hide the network addresses belonging to the customer networks 103. As used herein, the term "network address" may be used to refer to any addressing scheme that supports destination- or source-based routing (e.g., IP version 4 (IPv4) and/or IPv6 network addresses). For example, a network address translation service (NAT) may be employed to hide the actual network addresses of the customer networks. For example, NAT may be configured on the interface 127 of the mitigation servers 111 to perform destination address translation on traffic flowing to the customer networks 103. A device residing on the external networks 113 may receive a temporary network address for a system residing on the customer networks 103. For example, the device may query the name servers 119 to resolve the name of a web server residing on the customer network 103a and receive a temporary network address instead of its actual network address. Packets destined to the temporary network address are translated to its actual network address by the mitigation servers 111 on interface 127. Similarly, traffic returning from the web server may be translated such that the actual network address of the server is translated to the temporary network address.

Traffic between the external networks 113 and the customer networks 103 may be additionally protected by tunneling across the service provider network 101. In one embodiment, the traffic is routed between the service provider network 101 and the customer networks 103 via tunnels configured between the internal customer-facing interfaces (e.g., interface 127) of the mitigation servers 111 and the external interfaces (e.g., interface 129) of the customer networks 103.

As shown, the mitigation servers 111 may be connected to the DDoS mitigation platform 115 and the black hole systems 121 across the service provider network 101. A black hole system may be used to quarantine and analyze malicious traffic. In one embodiment, the mitigation servers 111 may redirect or reroute traffic away from the customer networks 103 and towards the black hole systems 121 upon a determination that the traffic is malicious. For example, the DDoS mitigation platform 115 may track traffic originating from the external networks 113 with the aid of the reputation database 117 and perform updates to the reputation of a particular sender at predefined intervals. If, based on the updates, the reputation of a particular sender indicates it may be an attacker, the mitigation servers 111 may be configured to route that traffic away from the customer networks 103 and towards the black hole systems 121. As discussed later, the determination that a particular sender is an attacker may only be made inferentially and is based on careful observation of the traffic and tracking its source.

To better appreciate the mitigation services of the system 100, it is instructive to understand the complexity of DDoS attacks. It is recognized that the trend towards dependence on information and communications systems is accelerating rather than slowing down—as is the gap between the security challenges and the awareness of them. In fact, with the expansion and growth of technology, simple dependence is evolving into interdependence. What happens to one system now has the potential to affect operations on myriad other systems that may only be peripherally related to the target of the initial intrusion. As the dependence on information systems accelerates, so do the attacks that target these systems, which can be critical. According to the Computer Emergency Response Team (CERT) Security Threat Evolution model, the DDoS attack is one of the most complex forms of attack to evolve, and likewise one of the most difficult to defend against. DDoS attacks are a real and growing-threat to businesses and other organizations worldwide. Designed to elude detection, these attacks can quickly incapacitate a targeted business, causing significant loss in revenue and productivity. Notably, DDoS attacks paralyze Internet systems by overwhelming servers, network links, and network devices (e.g., routers, firewalls, etc.) with bogus or "bad" traffic. Easily launched against limited defenses, DDoS attacks not only target individual websites or other servers at the edge of the network, they subdue the network itself.

DDoS attacks work by exploiting the communication protocols (e.g., Transmission Control Protocol/IP (TCP/IP) suite) responsible for transporting the data reliably over the Internet. The difficulty in detecting and mitigating DDoS attacks lies in illegitimate packets being indistinguishable from legitimate packets. Thus, typical "signature" pattern matching, performed by intrusion detection systems, is ineffective. This is largely because the attack signatures are not sufficiently responsive to the measures taken by attackers to hide features or properties that may be used to recognize malicious traffic. Many of these attacks also use spoofed source IP addresses, thereby eluding source identification by anomaly-based monitoring tools scanning for unusually high volumes of traffic coming from specific origins. A growing trend among DDoS attackers is to use sophisticated spoofing techniques and essential protocols (instead of nonessential protocols that can be blocked) to make DDoS attacks even more stealthy and disruptive. Undoubtedly, these attacks, which use legitimate application protocols and services, are very difficult to identify and defeat; and employing packet-filtering or rate-limiting measures simply aids in the attacker's goal of denying services (e.g., access to network resources) to legitimate users.

To address this issue, the system 100 surreptitiously tracks and inspects suspicious traffic to confirm the identity of an attacker. Subsequently, the system 100 may employ attack signatures based on an analysis of the traffic originating from the attacker to reroute malicious traffic without the knowledge of the attacker. For example, the DDoS mitigation platform 115 may non-disruptively route or forward suspected traffic to the black hole servers 121 for detailed inspection or analysis of the traffic and any associated server logs. The black hole systems 121 may develop attack signatures based on their analysis of the malicious traffic. These attack signatures may thereafter be installed at various points of the service provider network 101. The system 100 also provides the capability to send samples of the inbound traffic flows (traffic from an external network device) to the DDoS mitigation platform 115 for further analysis. In one embodiment, the DDoS mitigation platform 115 may generate an alert if it determines that a customer is the victim of a DDoS attack.

Although DDoS attacks are specifically discussed, it is contemplated that the approaches and techniques described herein may be employed to mitigate any number of attacks including, but not limited to, resource exhaustion attacks (buffer overflow, routing table overflow, repudiation, session hijacking, etc.). In addition, although the discussion focuses on attacks originating from external networks, it is contemplated that the same or similar mitigation techniques may be implemented to mitigate attacks originating from within the service provider network or from the customer network itself.

The DDoS mitigation and detection services of the system 100 may employ various address management schemes in conjunction with a name resolution service to track and identify attackers. In one embodiment, the DDoS mitigation platform 115 allocates or causes to allocate temporary network addresses from blocks of unused public network addresses maintained by the service provider and further causes them to be assigned to the customer networks. As used herein, the term "public network address" refers to externally routable addresses. For example, IP addresses are considered public if they are not reserved for private use and traffic can be routed to them over the Internet. The blocks of unused public addresses may include addresses returned to the pool of available addresses as they are released by old customers or decommissioned network equipment. In one embodiment, the size of the unused public network address space is large enough to allow periodic deployment of a non-repeating set of temporary network addresses. In one embodiment, the temporary network address sets may be sufficiently random from one set to the next such that the same address is at least not used more than once in three consecutive sets. Thus, an external network device 123 querying the address of a customer network device 125 may receive a different address each time. The address management scheme employed by the system 100 is described in greater detail in relation to FIGS. 1C and 1D.

FIG. 1B is a diagram of entries in the reputation database 117. The reputation database 117 may be used to track the external network devices that have queried the name servers 119. In one embodiment, the reputation database 117 may maintain a record of all responses to lookup requests from the external networks 113. For example, when a network address lookup request is received, the DDoS mitigation platform 115 may log to the reputation database 117 the requestor's network address ('External Network Device Address'), its hostname ('External Network Device Name') and the temporary network address provided ('Customer Network Device Address').

In one embodiment, the DDoS mitigation platform 115 may associate a reputation score with an external network device to indicate the likelihood that the device is an attacker. As shown in FIG. 1B, the external network device may be assigned a reputation score between 0-255 with 0 indicating that the device is not associated with any known attacks (a flawless reputation) and 255 indicating that the node is a known attacker (attacks every customer network device it requests a network address for). The higher the score, the greater the likelihood that the device is an attacker. For example, the external network device host2.domain2.org has a reputation score of zero indicating that it has not been associated with any attacks. On the other hand, external network device host3.domain3.net has a reputation score of 100 indicating that it may be a suspected attacker in at least one attack.

In one embodiment, the reputation data may be retained in the memory of the name servers 119. It is contemplated that the total memory usage may reliably not exceed 4 megabytes (MB) if a single byte reputation score is used for every IPv4 address. Because the contents of the reputation database 117 may be frequently purged, its content may only be relevant for a short time. In one embodiment, the events triggering reputation score increases may be stored in a longer term database (not shown) connected to the DDoS mitigation platform 115. This longer term database may be utilized to provide network administrators with a history of activity associated with particular external network devices. This may allow network administrators to report dates at which a particular offender was engaged in an attack against a customer network. In one embodiment, this longer term data may contributed to the Network Wall Garden (NWG) project data that may be used by other service providers to take customers reported as offenders offline and possibly lead to the cancellation of residential accounts for Terms of Service (ToS) or Acceptable Use Policy (AUP) violations.

In one embodiment, the DDoS mitigation platform 115 may determine the reputation score of an external network device by initially setting it to 0. Thereafter, if an attack is detected, the reputation database 117 may be mined or otherwise searched to determine the external network devices that were provided the attacked network address. The reputation score of every external network device that received the attacked network address is increased. The amount of the increase may vary based on various factors. In one embodiment, the amount of increase can be configured to vary as the inverse exponential of the number of external network devices that received the attacked address. The fewer their number, the greater the likelihood that any one of them is the attacker. For example, if only one external network device received the attacked address, the likelihood of that device being an attacker is close to unity. Thus, the reputation score for that external network device may be immediately raised to a high value to indicate that it is a known attacker (e.g., a botnet controller or someone assisting in a DDoS attack).

In one embodiment, the reputation score of an external network device may be used by the DDoS mitigation platform 115 to determine whether traffic from a particular external network device should be further analyzed. For example, external network devices whose reputation score satisfies a threshold value may be placed in a special group (e.g., a watch group). In one embodiment, the DDoS mitigation platform 115 may configure the name servers 119 to provide devices in the watch group with specific network addresses in subsequent rounds of address assignments. The special addresses may be monitored to determine whether the external network device is malicious.

In one embodiment, the DDoS mitigation platform 115 may cause traffic from an external network device to be redirected to the black hole systems 121 if the reputation score of the external network device satisfies a threshold value. The black hole systems 121 may be provisioned or otherwise configured to perform traffic analysis and help determine the effectiveness of anti-DDoS measures implemented by the service provider. The traffic analysis conducted by the black hole systems 121 may also be used to determine whether third-party vendor solutions for combatting DDoS attacks are cost-effective. For example, the quantity of malicious traffic being detected by the third-party solutions may be compared to the frequency with which the black hole systems 121 indicate a new attack. Furthermore, the analyzed information may be useful for reporting and billing purposes with respect to attacked systems.

In one embodiment, the black hole systems 121 may be configured to prevent the attacker from learning about the service provider's mitigation measures. In one embodiment, the return traffic from the black hole systems 121 may be routed to flow back to the attacker via the tunnels between the mitigation servers 111 and the customer networks (e.g., between interfaces 127 and 129 of the mitigation servers 111 and the customer networks 103, respectively). In this way, the mitigation servers 111 will continue to hide the actual network addresses of the customer network devices. In cases where tunneling is not employed, the mitigation servers 111 may be configured to perform both source and destination address translation of the inbound traffic to ensure that the return traffic is routed back through them.

Figure 1C:
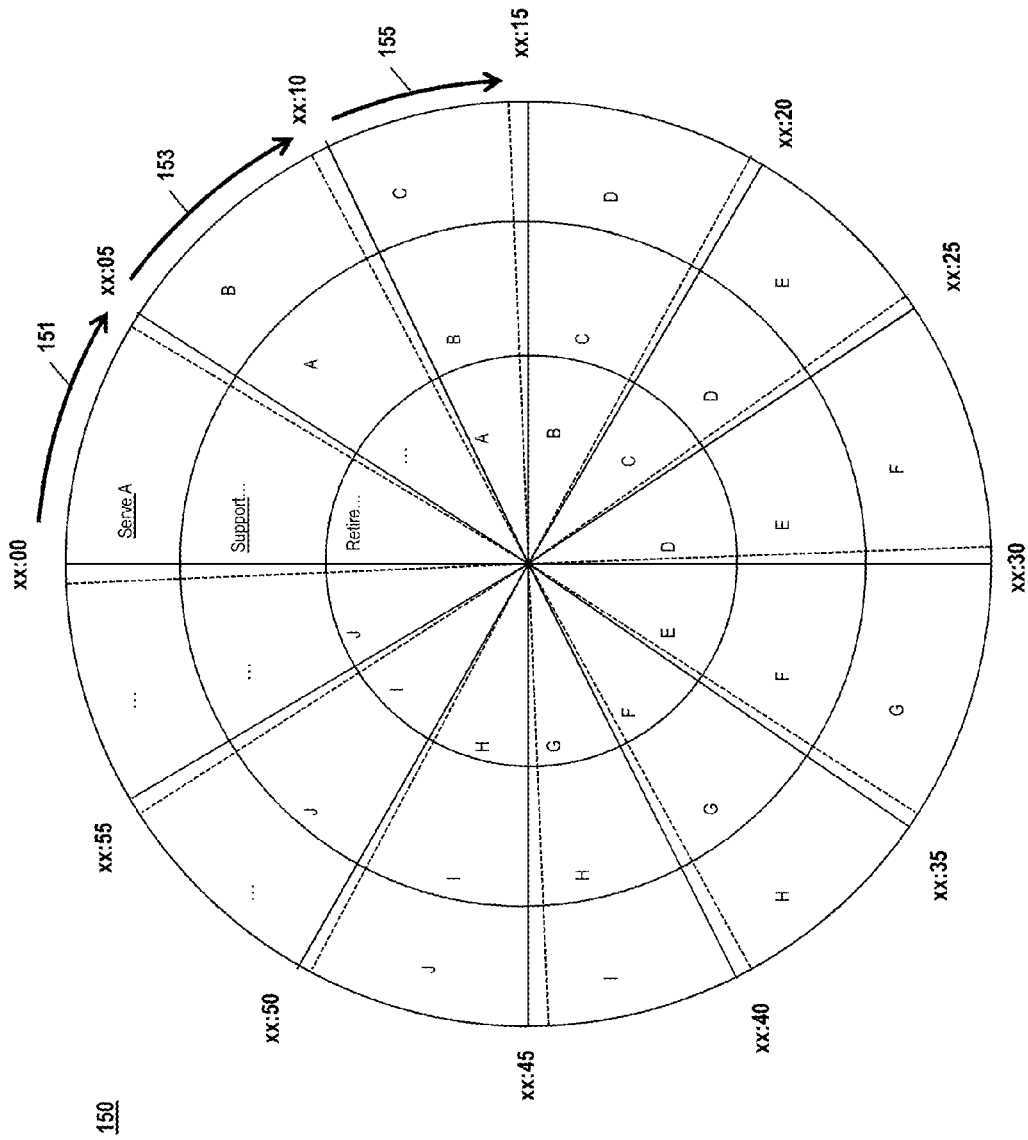
FIGS. 1C and 1D are diagrams of an address management scheme for DDoS mitigation, according to one embodiment.

FIG. 1C is a diagram of an address management scheme 150 for DDoS mitigation, according to one embodiment. As previously mentioned, in order to hide the actual network addresses of the customer networks 103, the DDoS mitigation platform 115 may allocate temporary network addresses for the customer networks 103 from blocks of unused public addresses maintained by the service provider. The name servers 119 may then be caused to periodically select and deploy a new set of randomly selected temporary network addresses from the pool of public addresses for a finite period. In the address management scheme 150, a new randomly selected group of network addresses is assigned to a customer network device's hostname every five minutes. In one embodiment, each such assignment may proceed by various stages, including serving, supporting and retiring stages. For example, in the first five-minute interval 151 (xx:00 to xx:05), the first set A of network addresses is served by the name servers 119. In one embodiment, immediately before the network addresses are served (as indicated by the broken lines), the name servers 119 are caused to generate forward and reverse records for the new set of temporary network addresses. As used herein, the term "forward record" may be used to refer to a name server record that resolves a hostname to a network address. As used herein, the term "reverse record" may be used to refer to name server record that resolves a network address to a hostname. For example, name server records for the forward and reverse records may be generated just prior to deploying the new set of temporary network addresses. Upon initiation of an interval, the name servers 119 begin responding to network address lookup and hostname lookup requests based on the generated records. For example, the name servers 119 respond to network address lookups based on the new set of temporary network addresses.

In one embodiment, at the end of the first finite period the name servers 119 deploy forward and reverse records for a second set of temporary network addresses different from the first set of temporary network addresses. Simultaneously, the name servers 119 destroy the forward records associated with the first set of temporary network addresses. Therefore, during a second finite period, the name servers 119 respond to network address lookup requests based on the second set of temporary network addresses. However, they maintain the reverse records associated with the first set of temporary network addresses. Therefore, the name servers 119 continue to respond to hostname lookup requests for network addresses belonging to the first set of temporary network addresses based on the reverse records of the first finite interval. For example, after the first five-minute interval 151, the name servers 119 deploy the second set B of temporary network addresses for the next five-minute interval 153 (xx:05 to xx:10). During the second five-minute interval 153, the name servers 119 continue to respond to hostname lookup requests, but not to network address lookup requests, based on the first set A.

In one embodiment, at the end of the second finite period the name servers 119 deploy forward and reverse records for a third set of temporary network addresses different from the first and second set of temporary network addresses. Simultaneously, the name servers 119 destroy the forward records associated with the second set of temporary network addresses and the reverse records associated with the first set of temporary network addresses. Therefore, during a third finite period, the name servers 119 respond to network address lookup requests based on the third set of temporary network addresses. The name servers 119 maintain the reverse records associated with the second set of temporary network addresses. Therefore, the name servers 119 continue to respond to hostname lookup requests for network addresses in the second set of temporary network addresses based on the reverse records deployed in the second finite interval. For example, after the second five-minute interval 153 (xx:05 to xx:10), the name servers 119 deploy a third set C of temporary network addresses for the third five-minute interval 155 (xx:10 to xx:15). The first set A of temporary network addresses is not used for either hostname lookup or network address lookup requests because the first set A has been retired by this point. As used herein, the term "retired" may be used to describe a set of temporary network addresses that is no longer used to respond to either network address or hostname lookup requests. In one embodiment, the name servers 119 destroy any records associated with a retired set of temporary network addresses. The second set B of temporary network addresses is only supported in response to hostname lookup requests.

In one embodiment, the addresses belonging to a retired set of temporary network addresses are returned to the pool of unused public addresses for reuse in succeeding intervals. The size of each set may be chosen to reduce the potential risk of an attacker predicting the temporary address of a customer network device, which would allow the attacker to bypass the name servers 119 entirely. For example, the address allocation scheme may be configured to hand out only five to ten percent of the addresses in the pool of unused public addresses per interval. The attacker, not being able to predict the address of its target, must obtain the target's address by sending an address lookup request to the name servers 119. Furthermore, as an attack proceeds and the time-to-live (TTL) timers for the lookup information in the attacker's network cache expire, the attacker must send additional lookup requests. In one embodiment, the TTL value may be set to the sum of two finite periods. For example, the name server 119 may set the TTL value of the hostname and network address records to ten minutes (the sum of the first and second five-minute time intervals).

As shown, the various stages (serving, supporting, retiring) of a set of temporary network addresses repeats continuously overlapping with the stages of one or more other sets of temporary network addresses. During any current finite period, one set of temporary network addresses is in a serving stage, another set is in a supporting stage, and another set of temporary network addresses is in a retiring stage. Additional stages may be added to the address management scheme while maintaining the cyclic stage-wise progression each set of temporary network addresses goes through.

Figure 1D:
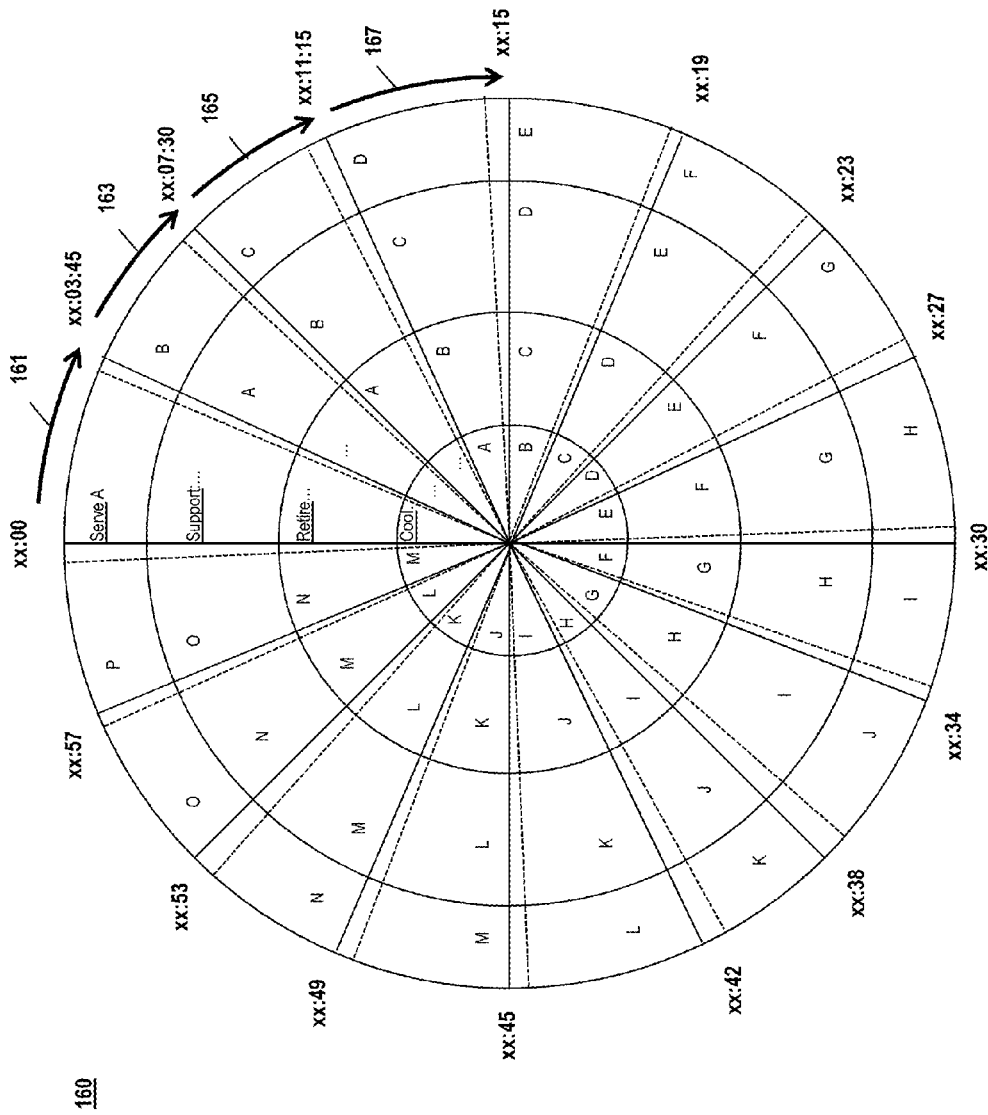

FIG. 1D is a diagram of an address management scheme 160 that includes additional stages, according to one embodiment. In one embodiment, an address management scheme includes an additional cool down stage after a set of temporary network addresses are retired to prevent the immediate return of the retired addresses back to the pool of unused public addresses. Thus, the retired addresses are not immediately available for reassignment and the likelihood of two successive sets of temporary network addresses including the same address is reduced. For example, the first interval 161 may be a serving interval, the second interval 163 may be the supporting interval, and the third interval 165 may be a retiring interval. In addition, a fourth interval 167 may be a cool down period. In one embodiment, an address management scheme may also employ preparatory and/or address staging phases before a serving stage.

The disclosure herein is independent of any particular interval size or any relationship between the interval size and the number of stages employed in an address management scheme. In one embodiment, the inclusion of additional stages may be accompanied by a shortening of the interval size. For example, the address management scheme 150 has three stages and the duration of each stage is approximately five minutes. In comparison, the address management scheme 160 has four stages and the duration of each stage has been shortened to three minutes and forty-five seconds. In general, the length of the interval may be set to less than or greater than five minutes. In one embodiment, the length may be varied from two minutes to fifteen minutes. At smaller interval lengths, the address management scheme operates faster because the address assignments for every customer network device occur more rapidly. In one embodiment, the length of the interval may be varied depending on an operating mode. For example, the interval may be raised (e.g., to fifteen minutes) during normal network operation. The length of the interval may be lowered (e.g., to five minutes) to speed up the address assignments when the service provider detects or suspects an attack. As the address assignments speed up, the attacker is forced to send lookup requests more frequently. Therefore, the DDoS mitigation platform 115 operates at a faster rate and mitigates the attack in a shorter period of time.

Figure 2:
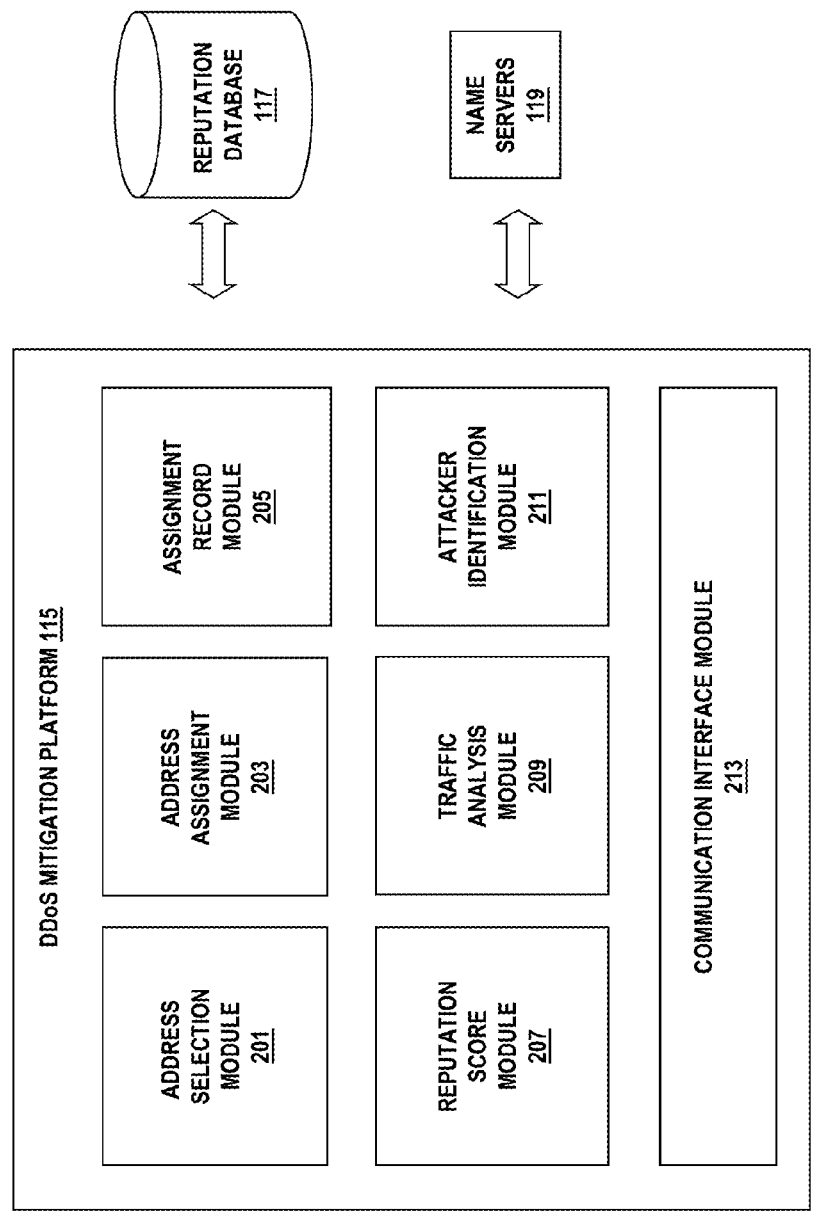
FIG. 2 is a diagram of a DDoS mitigation platform, according to one embodiment.

FIG. 2 is a diagram of the components of the DDoS mitigation platform 115, according to one embodiment. By way of example, the DDoS mitigation platform 115 includes one or more components for providing DDoS tracking and mitigation services. It is contemplated that the functions of these components may be combined in one or more components or performed by other components of equivalent functionality. In this embodiment, the DDoS mitigation platform 115 includes address selection module 201, an address assignment module 203, an assignment record module 205, a reputation score module 207, a traffic analysis module 209, an attacker identification module 211, and a communication interface module 213.

The address selection module 201 may be utilized to select a set of temporary network addresses. In one embodiment, the address selection module 201 receives or otherwise determines contiguous blocks of unused public addresses belonging to the service provider and selects the set of temporary network addresses from these blocks. The blocks may be continuously updated with new addresses as a result of network equipment being decommissioned in various parts of the service provider network 101 or one or more of the customer networks 103. The address selection module 201 may maintain a registry of all the currently unused public addresses. In one embodiment, the set of temporary network addresses are selected randomly to prevent an attacker from independently determining currently deployed network addresses. For example, the address selection module 201 may be configured to utilize various randomizing techniques implemented in software. In one embodiment, the address selection module 201 may select the set of temporary network addresses at configured time intervals the duration of which depends on a mode of operation. For example, during normal network operation the address selections may only be made every fifteen minutes. As used herein, "normal" may be used to describe a period of network operation during which no attacks have been reported or otherwise detected by the service provider or the customers. During emergency network operation, the address selection module 201 may be configured to select the sets of temporary network addresses at smaller intervals to speed up attack mitigation measures. In one embodiment, the address selection module 201 may select the set of temporary network addresses based on network traffic, server load and server proximity information. For example, the address selection module 201 may be configured to simultaneously select multiple sets of temporary network addresses if the service provider network 101 has multiple peering points. In one embodiment, the temporary network addresses may be selected among multiple peering points such that the traffic from external network devices is routed via the peering point closest to the destination device.

The address assignment module 203 may be utilized to assign a set of temporary network addresses to one or more hostnames. In one embodiment, the address assignment module 203 may assign one or more temporary network addresses from the set of temporary network addresses to a customer network device. For example, the address assignment module 203 may cause the name servers 119 to generate forward and reverse records for a set of temporary network addresses at the beginning of a regular finite time interval. In one embodiment, the records may be generated just before the beginning of the time interval. In one embodiment, the set of temporary network addresses may be selected by the address selection module 201. The address assignment module 203 may also configure the TTL value of the name server records may be set to correspond to the first cycle period. For example, the address assignment module 203 may set the TTL value to ten minutes for the address management scheme illustrated in FIG. 1C and to three minutes and forty-five seconds for the address management scheme illustrated in FIG. 1D. The hostname that the set of temporary network addresses are assigned to may belong to any device residing on a customer networks and/or the service provider network.

The assignment record module 205 may be utilized to maintain a record of the requestors associated with one or more lookup requests. In one embodiment, the assignment record module 205 may log the requestor's hostname, network address, and the temporary network address contained in the response to the network address lookup request. In one embodiment, the records may be stored in the reputation database 117. In one embodiment, the record may be logged at the name server that received the lookup request.

The reputation score module 207 may be utilized to determine a reputation score for each requestor. In one embodiment, the reputation score module 207 maintains a record for each requestor in the reputation database 117 and associates it with a reputation score. The reputation score may have an upper and lower limit (e.g., 0-255) such that the higher the score the greater the likelihood that the requestor is or is associated with an attacker. Thus, the reputation score module 207 may set the reputation score of a requestor to the lower limit (e.g., 0) if there is no suspicion that the requestor is an attacker. The reputation score module 207 may thereafter increase the reputation score if, based on an analysis of the assignment records, the requestor is associated with an attack. The reputation score may be determined based on the number of requestors receiving an attacked network address. For example, if the number of requestors that received an attacked network address is small, the likelihood that any one of them is the actual attacker is greater than it would be if the number of requestors is large. The reputation score is increased rapidly for a requestor when that requestor is the only one that received the temporary address associated with a customer network device under attack. The determination of the exact amount the reputation score should be increased may be determined based on a mathematical formula. For example, the amount of increase may be equal to the inverse exponential of the number of requestors normalized to the scale (e.g., 0-255). It is contemplated that various other measures for a reputation score may be used depending on the requirements and features of an attack mitigation scheme in accordance with the present disclosure.

In one embodiment, the response to a hostname lookup request, a network address lookup request, or a combination thereof, may be based on the reputation score of the requestor. For example, the address assignment module 203 may use the reputation score to assign a hostname with a temporary network address from a special set of temporary network addresses if the requestor is suspected of being an attacker. Such assignments may cause all traffic from the requestor to be routed to a quarantined section of the service provider network 101. The requestor may only receive a network address out of this special pool whenever it attempts to communicate with any customer network device. In one embodiment, the routing infrastructure of the service provider network 101 may be configured to route traffic destined to addresses belonging to the special set of temporary network addresses to the black hole systems 121. In one embodiment, the black hole systems 121 may include various network traffic analysis tools to further analyze the traffic originating from the requestor.

The traffic analysis module 209 may be utilized to analyze traffic and server logs for traffic that is malicious or is suspected to be malicious. In one embodiment, the traffic analysis module 209 obtains the traffic and server logs for a requestor from the mitigation servers 111. In one embodiment, the traffic analysis module 209 determines the requestors for which to obtain logs based on the reputation score of the requestor. The traffic analysis module 209 may use the results of its analysis to identify and classify features of the traffic flow, including an attack pattern. For example, the traffic analysis module 209 may access the reputation database 117 to determine the network address and hostname of one or more requestors that received an attacked temporary network address. The traffic analysis module 209 may then monitor traffic originating from these requestors. In one embodiment, the traffic analysis module 209 may cause the mitigation servers 111 to inspect the traffic. The traffic analysis module 209 may also cause specific traffic flows to be redirected or rerouted to the black hole systems 121 for further analysis. In one embodiment, the traffic analysis module 209 may generate attack signatures based on the analysis conducted by the black hole systems 121. The traffic analysis module 209 may cause the attack signatures to be deployed at the mitigation servers 111 in order to refine the identification of suspected attackers and to prevent further attack from the requestor suspected or confirmed as an attacker.

The attacker identification module 211 may be utilized to identify a requestor as a confirmed attacker. In one embodiment, the attacker identification module 211 monitors the reputation score of all requestors that received an attacked network address. The requestor may be identified as an attacker if the reputation score satisfies a threshold value. For example, the attacker identification module 211 may automatically cause a requestor to be labeled an attacker if the reputation score module 207 indicates that the requestor's reputation score is equal to or has exceeded an upper limit. Upon identification of an attacker, the attacker identification module 211 may further cause all traffic from the attacker to be shaped such that it is directed to a quarantined area of the service provider network 101. In one embodiment, the attacker traffic may be routed to the black hole systems 121 where the traffic is monitored and responded to in a manner that does not cause the attacker to modify or attempt to evade the mitigation measures employed by the service provider.

The DDoS mitigation platform 115 may further include a communication interface module 213 to communicate with other components of the DDoS mitigation platform 115, the mitigation servers 111, the name servers 119, and other components of system 100. The communication interface module 213 may include multiple means of communication. For example, the communication interface module 213 may be able to communicate over short message service (SMS), multimedia messaging service (MMS), IP, instant messaging, voice sessions (e.g., via a phone network), email, or other types of communication.

Although various embodiments are described with respect to DDoS mitigation platform 115, it is contemplated that the approach described herein may be used with other decentralized or distributed components. A distributed implementation of the DDoS mitigation platform 115 is described in relation to FIGS. 4 and 5.

Figure 7:
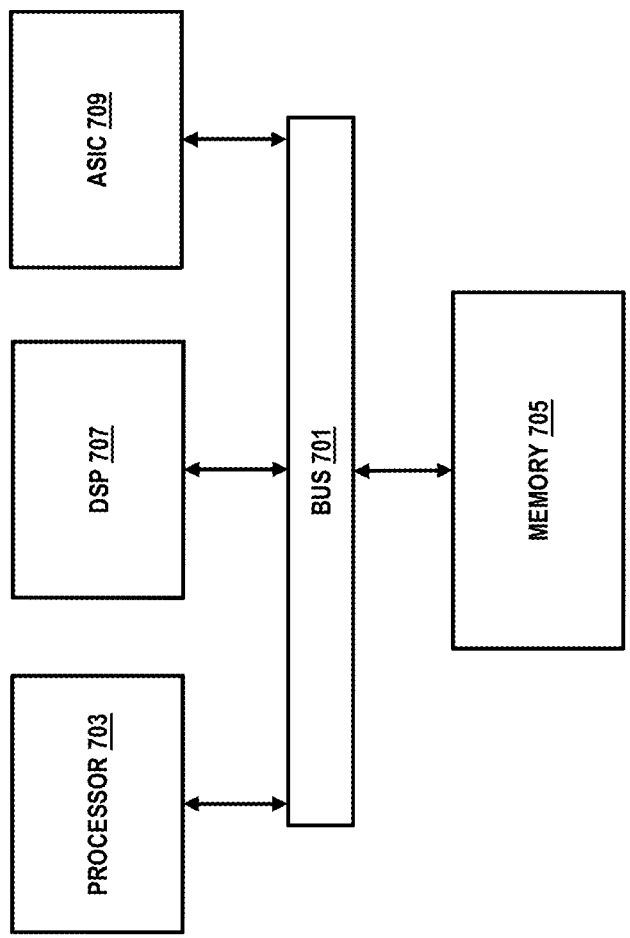
FIG. 7 is a diagram of a chip set that can be used to implement various exemplary embodiments.

FIG. 3A is a flowchart of a process 300 for mitigating a DDoS attack, according to one embodiment. For illustrative purpose, process 300 is described with respect to the system of FIG. 1A. In one embodiment, the DDoS mitigation platform 115 performs the process 300 and is implemented in, for instance, a chip set including a processor and a memory as shown in FIG. 7.

In step 301, a set of temporary network addresses is selected. In one embodiment, the address selection module 201 may select the set of temporary network addresses from a pool of unused public addresses maintained by the service provider. The pool of unused public addresses may include blocks of contiguous and non-contiguous address space belonging to the service provider. In one embodiment, the status of the addresses as being unused may be maintained in a central address registry such that the address selection module 201 only selects those addresses for inclusion in the set of temporary network addresses that are not being served, supported, or retired according to an address allocation scheme (e.g., address management schemes 150 and 160). The address selection module 201 may also not select addresses for any additional stages (e.g., cool down stage) in the address allocation scheme.

In step 303, a set of temporary network addresses are assigned to one or more hostnames for a finite period and other sets of temporary network addresses are assigned to the one or more hostnames in following finite periods. The finite periods may correspond to one or more time intervals of an address allocation scheme (e.g., address management scheme 150). In one embodiment, the address assignment module 203 may assign addresses from the set of temporary network addresses during a staging phase of the name servers 119 just before the beginning of a finite period. In one or more following finite periods, the address assignment module 203 may assign addresses to the hostnames from other sets of temporary network addresses. In one embodiment, the address assignment module 203 causes the name servers 119 to generate and deploy forward and reverse records for a set of temporary network addresses at regular time intervals.

In step 305, hostname lookup requests are responded to based on the set of temporary network addresses and the other sets of temporary network addresses that are active. By way of example, the hostname lookup requests may originate from the external network device 123 that is attempting to communicate with the customer network device 125. As used herein, the term "active" is used to describe temporary network addresses that have not been retired. In one embodiment, the name servers 119 respond to the hostname lookup requests based on reverse records generated in one or more previous finite periods. In one embodiment, the name servers 119 may examine the network address contained in the hostname lookup request and determine whether any reverse records associated with that network address exist (i.e., are not destroyed or purged). If such a record exists, the name servers 119 may respond to the hostname lookup request by transmitting the reverse record to the requestor.

In step 307, network address lookup requests are responded to based on the set of temporary network addresses and other sets of temporary network addresses associated with a current finite period. In one embodiment, the set of temporary network addresses are associated with a current finite period if the current finite period corresponds to a serving stage of an address allocation scheme (e.g., address management scheme 150). In one embodiment, the name servers may examine the hostname contained in the network address lookup request and determine whether any forward records associated with that hostname exist. Because the address allocation scheme may be configured to purge or otherwise destroy all forward records at the end of the serving stage, the only forward records that are active at any given time will necessarily be associated with the set of temporary network addresses that is currently being served.

In step 309, the set of temporary network addresses and other sets of temporary network addresses are retired after a configurable number of finite periods. In one embodiment, the address assignment module 203 may cause the name servers 119 to retire all records associated with a set of temporary network addresses after a serving and a supporting stage of an address allocation scheme (e.g., address management scheme 150). The configuration of the number of finite periods may depend on the number of stages of the address allocation scheme. For example, each set of temporary network addresses in the address management scheme 150 is retired after three successive finite periods of five minutes each. The retired addresses may be returned to the pool of unused public addresses. In one embodiment, the retired addresses are not immediately returned to the pool and may be instead held in a cool down group for an additional finite period.

In step 311, a reputation score of a requestor associated with the hostname lookup request, the network address lookup request, or a combination thereof, is determined. In one embodiment, the reputation score module 207 determines the reputation score, which is then used to update the entry for the requestor in the reputation database 117. In one embodiment, the reputation score module 207 monitors reports or indications of an attack and determines the identity of the requestors that received an attacked network address by searching the reputation database 117. The reputation score of all such requestors is increased and the amount of the score increase is determined based on various factors including, for example, the number of requestors that received the attacked network address.

Figure 3C:
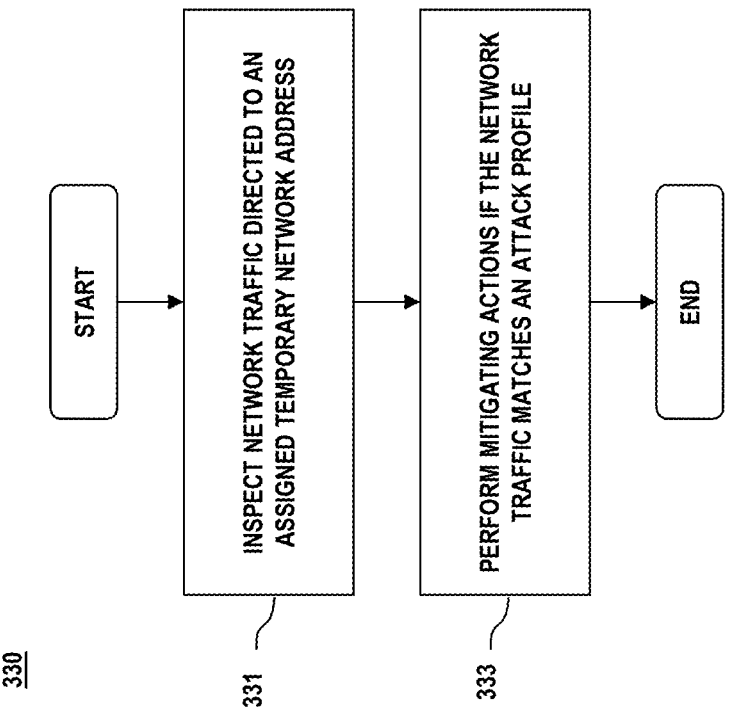
Figure 3B:
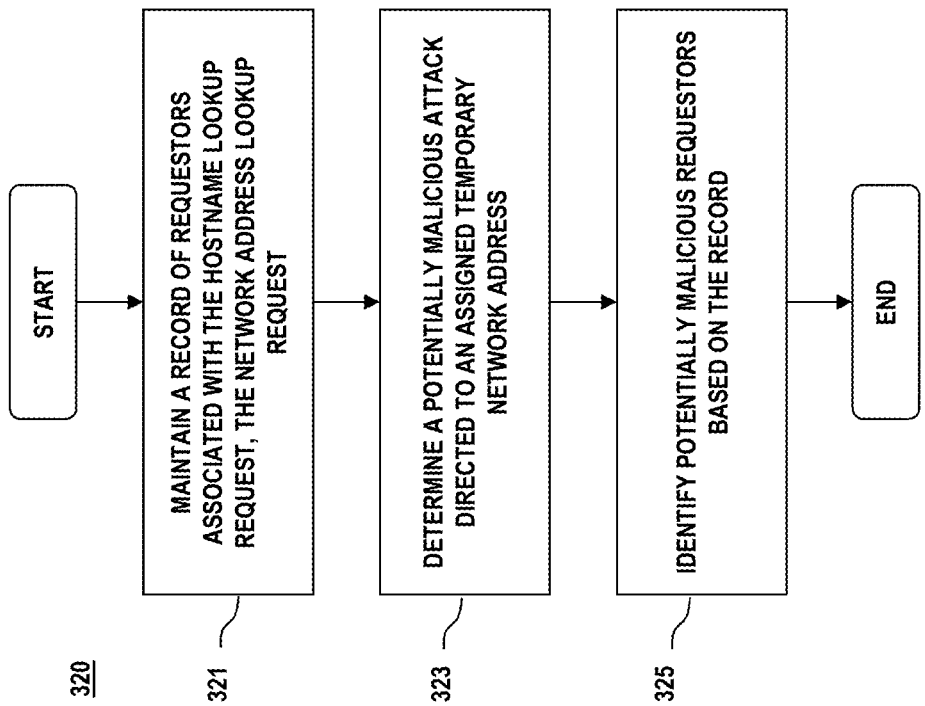

FIG. 3B is a flowchart of a process 320 for mitigating a DDoS attack, according to one embodiment. For illustrative purpose, process 320 is described with respect to the system of FIG. 1A. In one embodiment, the DDoS mitigation platform 115 performs the process 320 and is implemented in, for instance, a chip set including a processor and a memory as shown in FIG. 7.

In step 321, a record of the requestors associated with the hostname lookup request, the network address lookup request, or a combination thereof, is maintained. In one embodiment, the assignment record module 205 creates a record for every requestor in the reputation database 117. In one embodiment, the assignment record module 205 causes the records to be searchable based on the requestor's network address in order to quickly determine the temporary addresses received by any particular requestor.

In step 323, a potentially malicious attack directed to an assigned temporary network address is determined. As previously described, DDoS attacks are difficult to detect via in-band packet inspection because the malicious traffic is virtually indistinguishable from normal traffic. Therefore, an attack may be detected by observing various symptoms associated with a coordinated flow of packets to an overloaded device on a customer network. For example, the customer may report to the service provider that parts of its network (e.g., customer network 103a) are unreachable or are experiencing unusually high levels of inbound traffic. Other symptoms may include unusually slow network performance, unavailability of a web site, disconnection of wireless or wired connections, etc. The potentially malicious requestors behind the attack may be determined by mining or otherwise searching the record of requestors associated with the requestors using the record of the system under attack. In one embodiment, reports of such symptoms at one or more customer network or service provider network addresses are used to identify an attacked network address.

In step 325, potentially malicious requestors are identified based on their records. In one embodiment, the attacker identification module 211 may identify one or more requestors as a potentially malicious requestor based on the reputation score associated with the requestor. The attacker identification module 211 may monitor the reputation score of the requestors and may be caused to automatically identify a requestor as an attacker if the reputation score satisfies a threshold value. In one embodiment, the attacker identification module 211 may cause traffic from such requestors to be diverted or taken offline at the black hole systems 121. Such traffic, now identified as malicious traffic, may be used for further analysis of attack patterns, attack signatures, and refinement of various attack mitigation strategies employed by the service provider network 101. For example, the malicious traffic may be inspected according to various deep packet inspection tools to discover discernible properties for future prevention of an attack before it overloads a customer network device. Once discovered, such properties may be used to create attack signature files that can be installed at the mitigation servers 111 and/or various ingress points of the service provider network 101. In one embodiment, the service provider network 101 continues to receive and respond to the malicious traffic in order to prevent the attacker from learning that it has been identified. Accordingly, the attacker is deprived of the opportunity to counter the defensive measures by, for example, modifying the malicious traffic.

FIG. 3C is a flowchart of a process 330 for mitigating a DDoS attack, according to one embodiment. For illustrative purpose, process 330 is described with respect to the system of FIG. 1A. In one embodiment, the DDoS mitigation platform 115 performs the process 330 and is implemented in, for instance, a chip set including a processor and a memory as shown in FIG. 7.

In step 331, the network traffic directed to the first and/or second set of temporary network addresses is inspected. In one embodiment, the DDoS mitigation platform 115 may cause the traffic to be analyzed using various inline network analysis tools. Thus, the service provider may monitor traffic without disruption to normal network operations. In step 333, mitigating actions may be performed if the network traffic matches an attack signature. In one embodiment, such actions may include dropping the network traffic, transmitting a connection reset message, or forwarding the traffic to a black hole server. As described above, an attack signature may be developed after a requestor has been identified as an attacker. In one embodiment, the black hole systems 121 may be used to develop the attack signatures and install them at the mitigation servers 111 and/or various other network sites to detect future attacks. Traffic matches the attack signature may be sent to the black hole systems 121 where it may be dropped. Alternatively, various counter-measures may be directed at the requestors suspected of being the attackers. For example, connection reset messages (e.g., transmission control protocol (TCP) reset messages) may be sent to release the connections tying up the customer's network devices.

Figure 4:
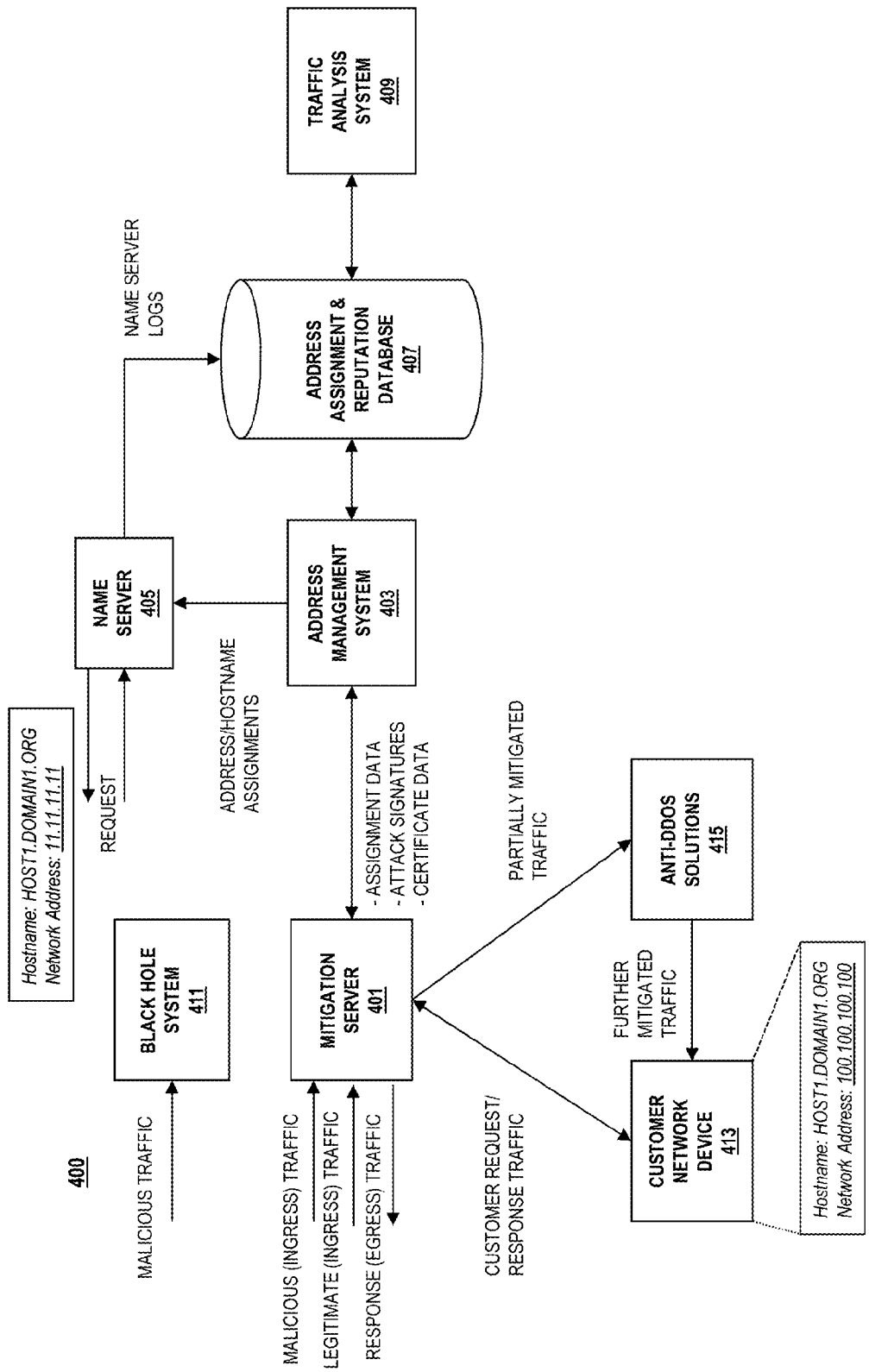
FIG. 4 is a diagram of a distributed architecture for a DDoS mitigation platform, according to one embodiment.

FIG. 4 illustrates a distributed implementation 400 of the DDoS mitigation platform 115, according to one embodiment. For illustrative purpose, the distributed implementation 400 is described with respect to the system of FIG. 1A. In one embodiment, the modules of the DDoS mitigation platform 115 illustrated in FIG. 2 may be separated out and incorporated into one or more of the systems in FIG. 4. The disclosure herein is independent of any particular implementation and the distributed implementation 400 is provided merely as an example of one such implementation.

In one embodiment, the mitigation server 401 is located at a network peering point and receives all ingress traffic, including malicious and legitimate traffic. As mentioned in relation to FIG. 1A, the service provider network 101 may have additional peering points, each of which may be similarly equipped with a corresponding mitigation server. As shown, the mitigation server 401 is connected to an address management system 403. In one embodiment, the address management system 403 corresponds to, or includes the functionality of, the address selection module 201, address assignment module 203, assignment record module 205, and reputation score module 207. The address management system 403 is connected to the name server 405 as well as to the address assignment and reputation database 407. In one embodiment, the name server 405 may be utilized to respond to network address and hostname lookup requests received from requestors. In one embodiment, the address management system 403 may record the address assignments and requestor information along with the reputation score of each requestor in the address assignment and reputation database 407. As shown, a traffic analysis system 409 may also be connected to the address assignment and reputation database 407. In one embodiment, the traffic analysis system 409 may correspond to, or incorporate the functionality of, the attacker identification module 211. Accordingly, the traffic analysis system 409 may be configured to monitor the reputation score of every requestor and generate attack signatures for the traffic originating from a particular requestor if its reputation score satisfies a threshold value. Traffic that matches the attack signature may be redirected to the black hole system 411. In one embodiment, the black hole system 411 may correspond to, or include the functionality of, the black hole systems 121. Thus, the address management system 403, name server 405, address assignment and reputation database 407, traffic analysis system 409, and the black hole system 411 may be configured to implement a network-wide DDoS mitigation scheme in a distributed fashion.

As shown, the mitigation server 401 receives both legitimate and malicious traffic from external network devices. By way of example, the ingress traffic is destined to the customer network device 413. In one embodiment, the ingress traffic may first be forwarded to a third-party (or proprietary) anti-DDoS technology solution ("anti-DDoS solution") 415 before being sent to the customer network device 413. The anti-DDoS solution 415 may comprise software and systems for detection of a DDoS attack. In one embodiment, the DDoS mitigation platform 115 may be used to determine the effectiveness of such anti-DDoS solutions. For example, the effectiveness of an anti-DDoS solution may be determined by observing whether the solution reports an attack that has been detected by the DDoS mitigation platform 115.

As shown, the mitigation server 401 may receive assignment data, attack signatures and certificate data from the address management system 403. In one embodiment, the assignment data may include information about temporary network address assignments for the customer network device 413. As described in relation to the address management scheme in FIGS. 1C and 1D, the customer network device 413 may be assigned temporary network addresses at regular intervals and the record of those assignments may be kept at the name server 405 or at the address assignment and reputation database 407. In one embodiment, the address management system 403 may cause the mitigation server 401 to install attack signature files at its ingress interfaces. As mentioned, the attack signature files may be determined based on the results of the traffic analysis system 409. Based on these attack signatures, the mitigation server 401 may be used to detect future DDoS attacks.

As shown, the address management system 403 may cause the name server 405 to deploy a name server record for the customer network device 413. In one embodiment, the address management system 403 may periodically cause the name server 405 to deploy temporary network addresses for the customer network device 413. An external network device (not shown) may request the address of the customer network device 413 and receive a temporary network address from the name server 405 thus configured.

As further shown, the black hole system 411 is used to receive and quarantine all malicious traffic. In one embodiment, this may be done after an external network device has been confirmed as an attacker (e.g., botnet or botnet controller) to a high certainty. For example, the reputation score of the external network device may satisfy a threshold value. The address management system 403 may cause the name server 405 to respond to all requests from the attacker with the address of the black hole system 411 thereby causing it to receive all traffic from the attacker.

Figure 5A:
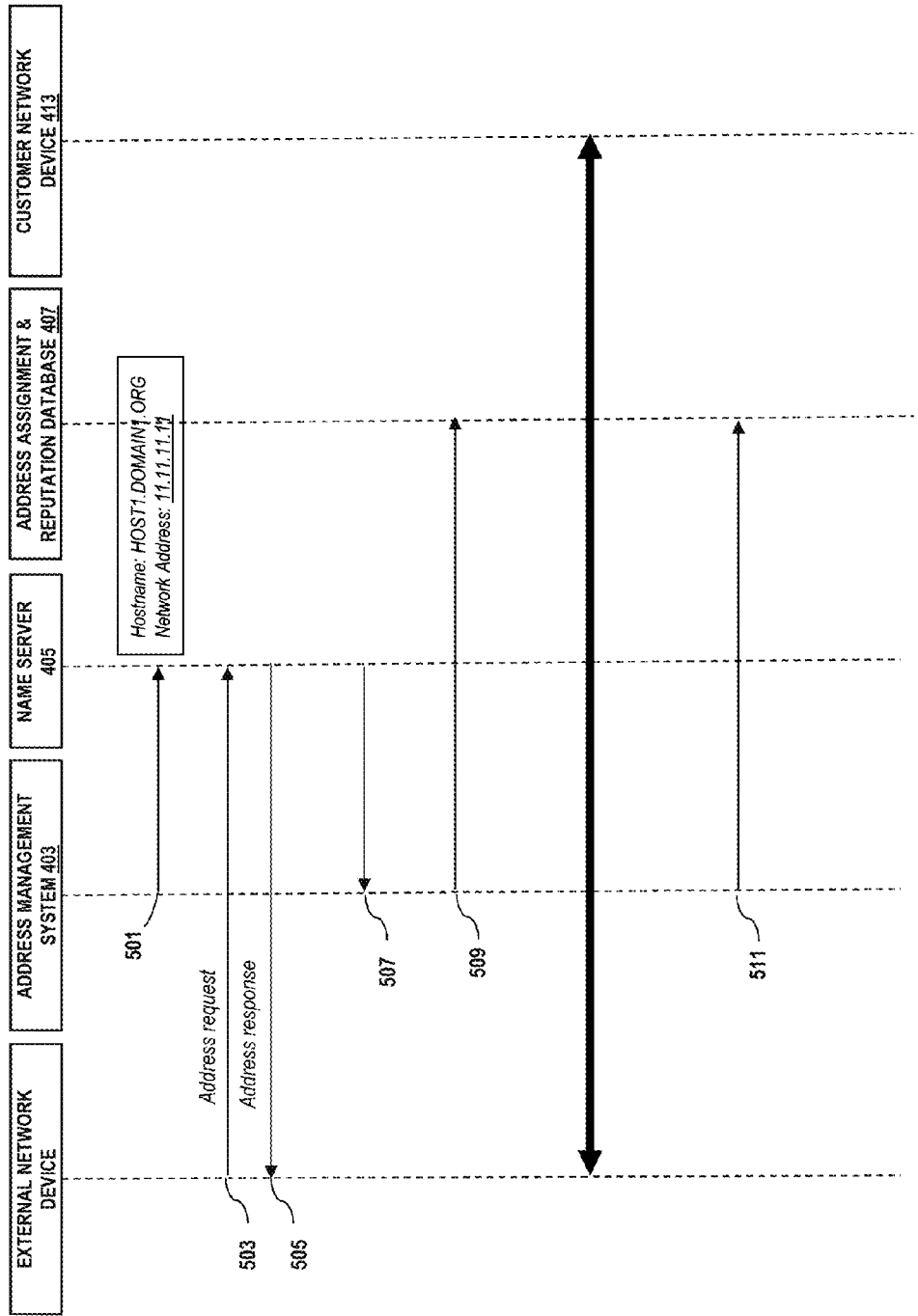
FIGS. 5A and 5B are ladder diagrams of a process for DDoS mitigation, according to one embodiment.
Figure 5B:
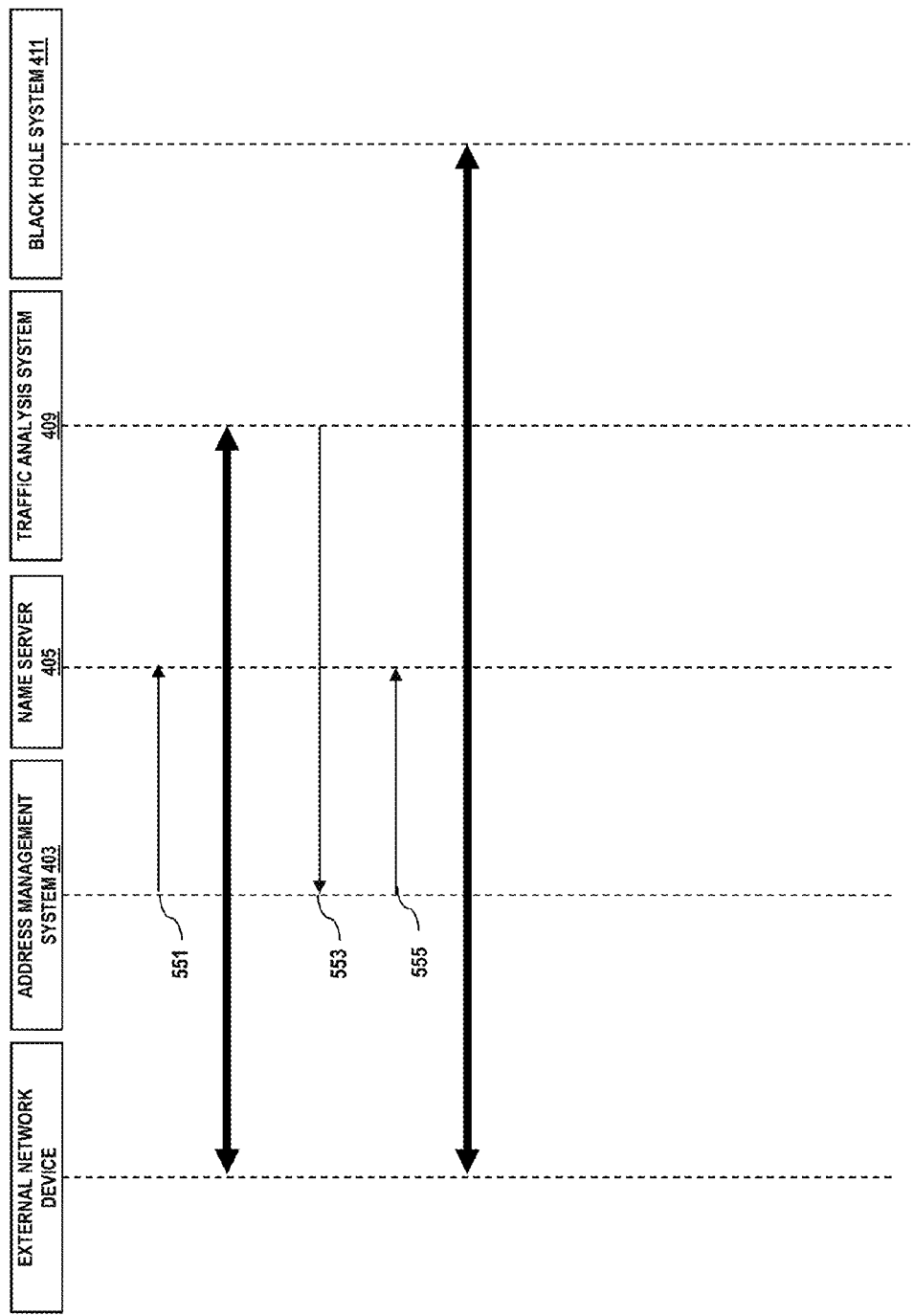

FIGS. 5A and 5B are ladder diagrams of a process of DDoS mitigation, according to one embodiment. For illustrative purpose, the ladder diagrams are explained with respect to the distributed implementation 400 in FIG. 4. By way of example, the process is explained with respect to an external network device (not shown for illustrative convenience) attempting to communicate with the customer network device 413 via the service provider network 101.

In step 501, the address management system 403 causes the name server 405 to generate and deploy forward and reverse records for the customer network device 413 based on a set of temporary network addresses. For example, the actual address of the customer network device 413 may be 100.100.100.100. In order to hide the actual address, the name server 405 may be configured to handout the temporary network address of 11.11.11.11 instead. In one embodiment, the temporary network address is a public address selected from a pool of unused public addresses belonging to the service provider. In step 503, the external network device requests the address of the customer network device 413 with the hostname "host1.domain1.org" and in step 505 receives the temporary network address of 11.11.11.11.

In step 507, the name server 405 reports the address assignment to the address management system 403 along with the hostname and network address of the requestor. In step 509, the address management system 403 logs the requestor's information and the temporary address in the address assignment and reputation database 407. Having received the temporary network address (11.11.11.11) of the customer network device 413, the external network device then begins communicating with the customer network device 413. The traffic between the devices traverses the mitigation server 401 and is routed or otherwise relayed by the service provider network 101.

The process of handing out address information may continue in successive communication sessions between the devices. In one embodiment, each session may correspond to a connection-oriented or connectionless network protocol. In one embodiment, the external network device may submit a new network address request each time the existing address information expires out of its cache (e.g., due to expiry of TTL). To continue communication, the external network device will again request address information from the name server 405. In one embodiment, the name server 405 will respond to the request based on the set of temporary addresses currently deployed. In one embodiment, the name server 405 may support the previous temporary network address to respond to hostname lookup requests but may no longer provide the previous address for a new address request.

In step 511, the reputation score of the external network device may be updated in the address assignment and reputation database 407. In one embodiment, the reputation score for the external network device may be incremented each time a DDoS attack is reported at the temporary network address that is currently deployed. In one embodiment, the reputation score may be raised immediately to a high value to indicate that the external network device is a confirmed attacker (e.g., botnet or botnet controller) if the external network device was the only device that received an attacked network address.

FIG. 5B illustrates the steps of DDoS attack mitigation after the external network device is confirmed to be an attacker, according to one embodiment. In step 551, the address management system 403 causes the name server 405 to respond to future requests from the external network device with addresses out of a special pool of addresses. In one embodiment, the special pool of address may be selected to direct all traffic from the external network device to the traffic analysis system 409 for inspection. In one embodiment, the traffic analysis system 409 may utilize the redirected malicious traffic to generate attack signatures. These profiles may be used to recognize future attacks of the same type. In step 553, the traffic analysis system 409 may provide the address management system 403 the attack signatures that have been developed. The address management system 403 may further supply these attack signatures to the mitigation server 401 to match any ingress traffic against. In step 555, the address management system 403 may cause the name server 405 to respond to all requests from the attacker with the address of the black hole system 411. Thereafter, all traffic from the external network device travels to the black hole system 411.

The processes described herein for mitigating DDoS attacks may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
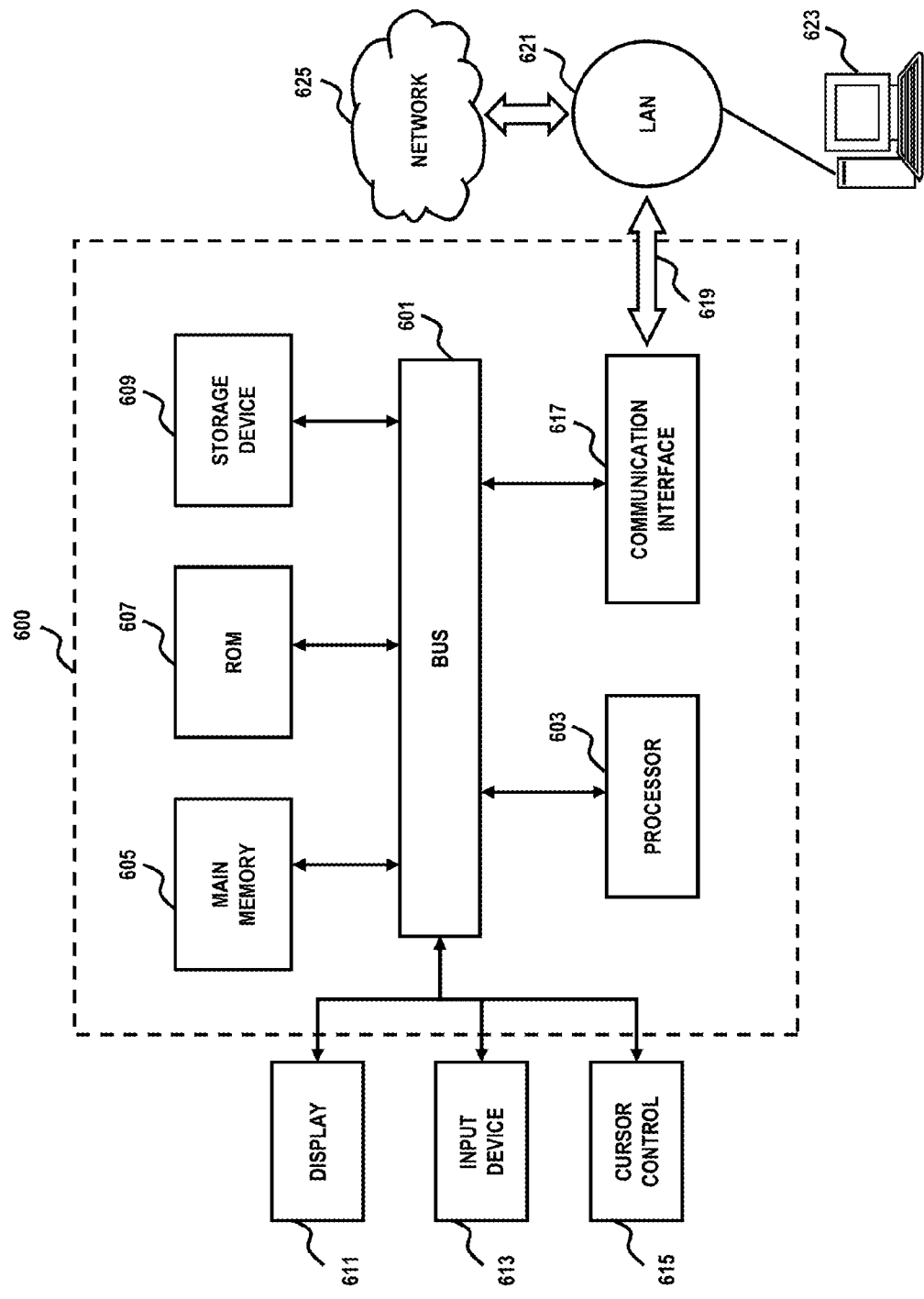
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk, flash storage, or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. Additional output mechanisms may include haptics, audio, video, etc. An input device 613, such as a keyboard including alphanumeric and other keys, is coupled to the bus 601 for communicating information and command selections to the processor 603. Another type of user input device is a cursor control 615, such as a mouse, a trackball, touch screen, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to enable cloud-based profile access as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling the management of device profiles.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable cloud-based profile access. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A computer-implemented method of operating a communication system comprising:
   assigning, by a computer processor, a set of temporary network addresses to a hostname for a finite period and assigning one or more other sets of temporary network addresses to the hostname in one or more following finite periods;
   responding to a hostname lookup request based on the set of temporary network addresses, the one or more other sets of temporary network addresses, or a combination thereof that are active;
   responding to a network address lookup request based on at least one of the set of temporary network addresses and the one or more other sets of temporary network addresses that is associated with a current one of the finite period or the one or more following finite periods; and
   retiring the set of temporary network addresses, the one or more sets of temporary network addresses, or a combination thereof after a configurable number of finite periods,
   wherein no further network address or hostname lookup request is served based on the retired set of temporary network addresses, the retired one or more sets of temporary network addresses, or a combination thereof.

2. A method of claim 1, further comprising:
   selecting the set of temporary network addresses, the one or more other sets of temporary network addresses, or a combination thereof randomly from a pool of available temporary network addresses.

3. A method of claim 1, further comprising:
   selecting the set of temporary network addresses, the one or more other sets of temporary network addresses, or a combination thereof based on network traffic information, server load information, server proximity information, or a combination thereof.

4. A method of claim 1, further comprising:
   maintaining a record of one or more requestors associated with the hostname lookup request, the network address lookup request, or a combination thereof,
   wherein the record includes one or more requestor network addresses, one or more requestor hostnames, one or more temporary network addresses, or a combination thereof.

5. A method of claim 4, further comprising:
   determining a potentially malicious attack directed to an assigned temporary network address; and
   identifying one or more potentially malicious requestors based on the record.

6. A method of claim 5, wherein the potentially malicious attack is a distributed denial of service (DDoS) attack.

7. A method of claim 1, further comprising:
   determining a reputation score of a requestor associated with the hostname lookup request, the network address lookup request, or a combination thereof,
   wherein a response to the hostname lookup request, the network address lookup request, or a combination thereof is based on the reputation score.

8. A method of claim 1, further comprising:
   inspecting network traffic directed to an assigned temporary network address; and
   performing one or more mitigating actions if the network traffic matches an attack profile,
   wherein the one or more mitigating actions include dropping the network traffic, transmitting a connection reset message, forwarding the traffic to a black hole server, or a combination thereof.

9. A communication system apparatus comprising a computer processor configured to:
   assign a set of temporary network addresses to a hostname for a current finite period and assign one or more other sets of temporary network addresses in one or more following finite periods;
   respond to a hostname lookup request in the current finite period based on the assigned set of temporary network addresses and one or more previously assigned sets of temporary network addresses;
   respond to a network address lookup request in the current finite period based on the assigned set of temporary network addresses; and
   retire the assigned set of temporary network addresses after a configurable number of finite periods; wherein no further network address or hostname lookup request is served based on the retired set of temporary network addresses, the retired one or more sets of temporary network addresses, or a combination thereof.

10. An apparatus according to claim 9, wherein the apparatus is further caused to:
    select the set of temporary network addresses randomly from a pool of available temporary network addresses.

11. An apparatus according to claim 9, wherein the apparatus is further caused to:
    select the set of temporary network addresses based on network traffic information, server load information, server proximity information, or a combination thereof.

12. An apparatus according to claim 9, wherein the apparatus is further caused to:
    maintain a record of one or more requestors associated with network address lookup request,
    wherein the record includes one or more requestor network addresses, one or more requestor hostnames, one or more temporary network addresses, or a combination thereof.

13. An apparatus according to claim 12, wherein the apparatus is further caused to:
    determine a potentially malicious attack directed to an assigned temporary network address; and
    identify one or more potentially malicious requestors based on the record.

14. An apparatus according to claim 13, wherein the potentially malicious attack is a distributed denial of service (DDoS) attack.

15. An apparatus according to claim 9, wherein the apparatus is further caused to:

determine a reputation score of a requestor associated with the network address and hostname lookup requests, wherein a response to the network address and hostname lookup requests is based on the reputation score.

16. An apparatus according to claim 9, wherein the apparatus is further caused to:

inspect network traffic directed to an assigned temporary network address; and perform one or more mitigating actions if the network traffic matches an attack profile, wherein the one or more mitigating actions include dropping the network traffic, transmitting a connection reset message, forwarding the traffic to a black hole server, or a combination thereof.

17. A communication system comprising:

a mitigation platform comprising a computer processor configured to:

assign a set of temporary network addresses to a hostname for a current finite period and assign one or more other sets of temporary network addresses in one or more following finite periods, respond to a hostname lookup request in the current finite period based on the assigned set of temporary network addresses and one or more previously assigned sets of temporary network addresses, and respond to a network address lookup request in the current finite period based on the assigned set of temporary network addresses, and retire the assigned set of temporary network addresses after a configurable number of finite periods; wherein no further network address or hostname lookup request is served based on the retired set of temporary network addresses, the retired one or more sets of temporary network addresses, or a combination thereof.

18. A system according to claim 17, wherein the mitigation platform is further configured to select the set of temporary network addresses randomly from a pool of available temporary network addresses.

19. A system according to claim 17, wherein the mitigation platform is further configured to select the set of temporary network addresses based on network traffic information, server load information, server proximity information, or a combination thereof.

20. A system according to claim 17, wherein the mitigation platform is further configured to maintain a record of one or more requestors associated with network address lookup request, wherein the record includes one or more requestor network addresses, one or more requestor hostnames, one or more temporary network addresses, or a combination thereof.

* * * * *